United States Patent
Yoshida et al.

(10) Patent No.: US 12,238,425 B2
(45) Date of Patent: Feb. 25, 2025

(54) SHUTTER SPEED DETERMINATION DEVICE AND IMAGING DEVICE

(71) Applicant: Panasonic Intellectual Property Management Co., Ltd., Osaka (JP)

(72) Inventors: Norikatsu Yoshida, Hyogo (JP); Takeshi Hamasaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 190 days.

(21) Appl. No.: 17/798,275

(22) PCT Filed: Dec. 25, 2020

(86) PCT No.: PCT/JP2020/048678
§ 371 (c)(1),
(2) Date: Aug. 8, 2022

(87) PCT Pub. No.: WO2021/171774
PCT Pub. Date: Sep. 2, 2021

(65) Prior Publication Data
US 2023/0076396 A1    Mar. 9, 2023

(30) Foreign Application Priority Data
Feb. 25, 2020  (JP) .................. 2020-029556

(51) Int. Cl.
*H04N 23/73*   (2023.01)
*G06T 7/215*   (2017.01)
(Continued)

(52) U.S. Cl.
CPC ............. *H04N 23/73* (2023.01); *G06T 7/215* (2017.01); *G06T 7/238* (2017.01); *H04N 23/684* (2023.01); *H04N 23/6811* (2023.01)

(58) Field of Classification Search
None
See application file for complete search history.

(56) References Cited

U.S. PATENT DOCUMENTS

| 10,205,885 B2 | 2/2019 | Miyazawa et al. |
| 2008/0094498 A1 | 4/2008 | Mori |

(Continued)

FOREIGN PATENT DOCUMENTS

| JP | H05-030458 A | 2/1993 |
| JP | 2006-254634 A | 9/2006 |

(Continued)

OTHER PUBLICATIONS

International Search Report issued in International Patent Application No. PCT/JP2020/048678, mailed Mar. 23, 2021; with English translation.

(Continued)

*Primary Examiner* — Sinh Tran
*Assistant Examiner* — Esley J Chiu
(74) *Attorney, Agent, or Firm* — Rimon P.C.

(57) ABSTRACT

A shutter speed determination device includes a motion detector and controller. The motion detector, on a block-by-block basis having a specified block size, performs detection processing of a motion vector for image data obtained by capturing a subject image. The controller, while reducing the block size, causes the motion detector to execute the detection processing repeatedly, each time executing the detection processing the controller finds a motion vector related value that changes in a same direction as a direction in which a magnitude of the motion vector changes, the controller determines a shutter speed used when capturing the subject image thereafter, based on the motion vector related value found.

9 Claims, 13 Drawing Sheets

(51) Int. Cl.
*G06T 7/238* (2017.01)
*H04N 23/68* (2023.01)

(56) References Cited

U.S. PATENT DOCUMENTS

| | | | |
|---|---|---|---|
| 2011/0032414 A1 | 2/2011 | Sumiyoshi et al. | |
| 2016/0301858 A1 | 10/2016 | Aoyama | |
| 2016/0360114 A1 | 12/2016 | Abe | |
| 2017/0214838 A1* | 7/2017 | Miyazawa | H04N 23/6815 |
| 2018/0063439 A1 | 3/2018 | Miyazawa | |
| 2018/0131869 A1* | 5/2018 | Kim | G06V 40/172 |
| 2018/0336688 A1* | 11/2018 | Narita | G06T 7/194 |
| 2020/0213496 A1* | 7/2020 | Honda | H04N 23/73 |
| 2020/0244886 A1* | 7/2020 | Sasaki | H04N 23/45 |
| 2022/0132068 A1* | 4/2022 | Soda | H04N 25/11 |

FOREIGN PATENT DOCUMENTS

| | | |
|---|---|---|
| JP | 2008-136174 A | 6/2008 |
| JP | 2011-040902 A | 2/2011 |
| JP | 2016-201626 A | 12/2016 |
| JP | 2017-005400 A | 1/2017 |
| JP | 2017-134185 A | 8/2017 |
| JP | 2018-025611 A | 2/2018 |
| JP | 2018-037772 A | 3/2018 |
| JP | 2018-195084 A | 12/2018 |

OTHER PUBLICATIONS

International Preliminary Report on Patentability dated Sep. 9, 2022 issued in International Patent Application No. PCT/JP2020/048678, with English translation.

Notice of Reasons for Refusal dated Dec. 12, 2023 issued in the corresponding Japanese Patent Application No. 2022-503122, with English machine translation.

* cited by examiner (a) 1ST (b) 2ND (c) 3RD (a) 1ST (b) 2ND (c) 3RD (d) 4TH (a) 1ST (b) 2ND (c) 3RD

SHUTTER SPEED DETERMINATION DEVICE AND IMAGING DEVICE

CROSS-REFERENCE OF RELATED APPLICATIONS

This application is the U.S. National Phase under 35 U.S.C. § 371 of International Patent Application No. PCT/JP2020/048678, filed on Dec. 25, 2020, which in turn claims the benefit of Japanese Patent Application No. 2020-029556, filed on Feb. 25, 2020, the entire disclosures of which Applications are incorporated by reference herein.

TECHNICAL FIELD

The present disclosure relates to a shutter speed determination device and an imaging device.

BACKGROUND ART

Patent Document 1 discloses an imaging device in which an image is divided into K×L blocks to detect a motion vector for each block, to set a shutter speed matching the velocity of the fastest motion vector of the detected motion vectors.

PATENT DOCUMENT

Patent Document 1: JP2006-254634A

SUMMARY OF THE INVENTION

Problem to be Solved by the Invention

The present disclosure provides a shutter speed determination device and an imaging device, capable of reducing the blurring of a moving subject when detecting the motion vectors to determine the shutter speed.

Means for Solving Problem

A shutter speed determination device according to the present disclosure includes a motion detector and controller. The motion detector that, on a block-by-block basis having a specified block size, performs detection processing of a motion vector for image data obtained by capturing a subject image. The controller, while reducing the block size, causes the motion detector to execute the detection processing repeatedly, each time executing the detection processing the controller finds a motion vector related value that changes in a same direction as a direction in which a magnitude of the motion vector changes, the controller determines a shutter speed used when capturing the subject image thereafter, based on the motion vector related value found.

An imaging device according to the present disclosure includes: a shutter speed determination device; an imaging sensor that captures a subject image to create image data; and a controller that causes the imaging sensor to perform imaging at a shutter speed determined by the shutter speed determination device.

Effect of the Invention

According to the present disclosure, the blurring of the moving subject can be reduced when detecting the motion vectors to determine the shutter speed.

EMBODIMENT(S) FOR CARRYING OUT THE INVENTION

Figure 1:
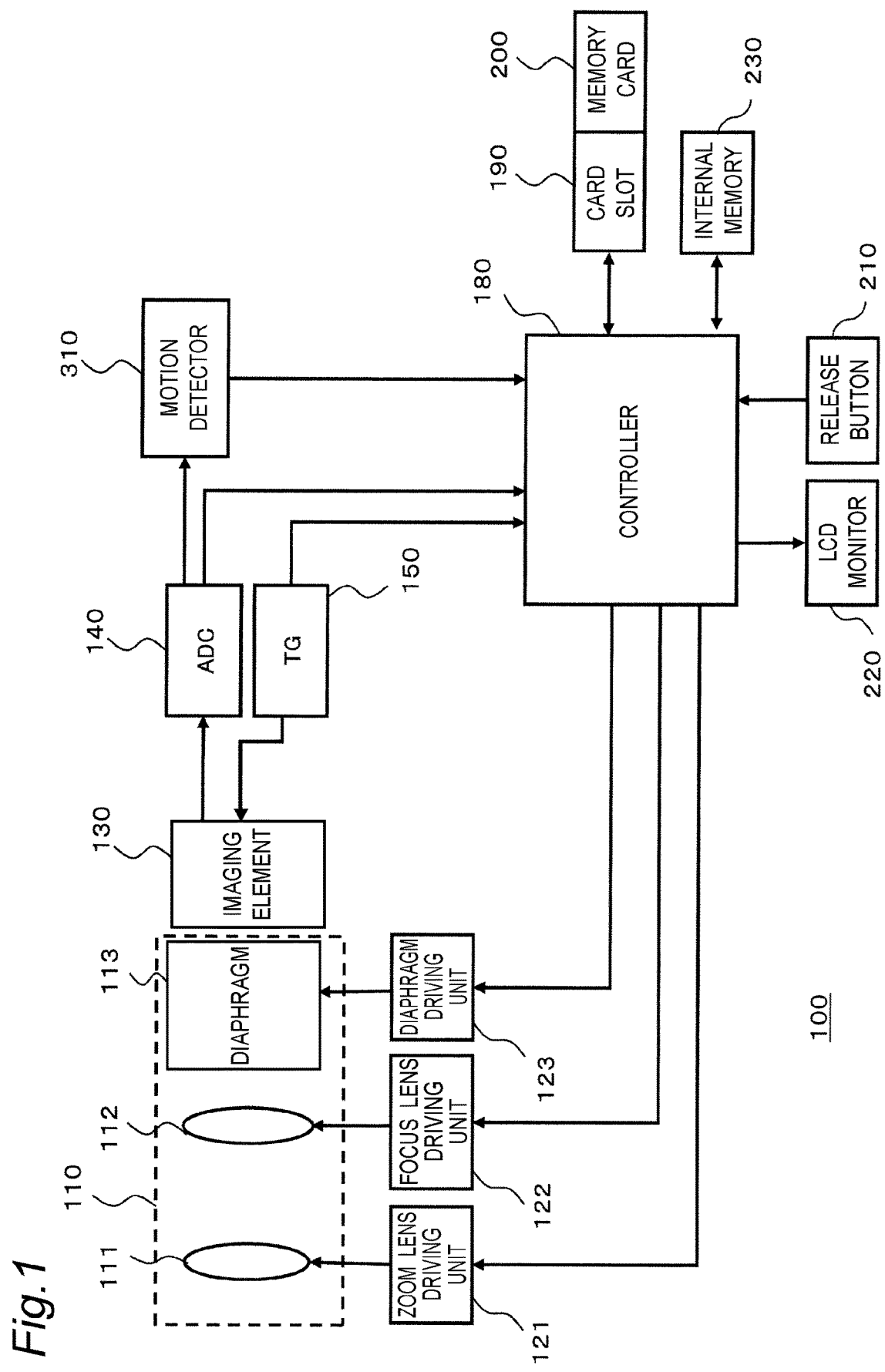
FIG. 1 is a view showing a configuration of a digital camera of a first embodiment.

Hereinafter, referring to the drawings as appropriate, embodiments will be described in detail. However, more detailed description than necessary may be omitted. For example, detailed description of already well-known matters and duplicated description for substantially the same configuration may be omitted. This is to prevent the following description from becoming unnecessarily redundant and to facilitate the understanding of those skilled in the art. It is to be noted that the inventor(s) provides(provide) the accompanying drawings and the following description in order to help those skilled in the art fully understand the present disclosure and that the subject matters defined in the claims are not intended to be limited thereby.

First Embodiment

In this embodiment, a mode is described in which a shutter speed determination device and an imaging device according to the present disclosure are applied to a digital camera.

1-1. Configuration

FIG. 1 is a block diagram showing a configuration of a digital camera 100 of a first embodiment.

The digital camera 100 includes an optical system 110, an imaging element 130, an LCD monitor 220, a controller 180, a motion detector 310, a card slot 190, etc.

The optical system 110 includes a zoom lens 111, a focus lens 112, and a diaphragm 113.

The zoom lens 111 is a lens for varying the magnification of a subject image formed on the imaging element 130 in the optical system 110, The zoom lens 111 includes a single or a plurality of lenses. A zoom lens driving unit 121 includes a zoom ring or the like operable by the user so that the users operation is transmitted to the zoom lens 111 to move the zoom lens 111 along the direction of an optical axis of the optical system 110.

The focus lens 112 is a lens for varying the focused state of the subject image formed on the imaging element 130 in the optical system 110. The focus lens 112 is composed of a single or a plurality of lenses.

A focus lens driving unit 122 includes a motor to move the focus lens 112 along the optical axis of the optical system 110 based on control of the controller 180. The focus lens driving unit 122 can be implemented e.g. by a DC motor, a stepping motor, a servomotor, or an ultrasonic motor.

The diaphragm 113 is an element adjusting the amount of light incident on the imaging element 130. The diaphragm 113 includes e.g. a plurality of diaphragm blades and adjusts the size of an aperture formed by the diaphragm blades, to thereby adjust the amount of light incident on the imaging element 130.

A diaphragm driving unit 123 drives the diaphragm 113. The diaphragm driving unit 123 can be implemented e.g. by a DC motor, a stepping motor, a servomotor, or an ultrasonic motor.

The imaging element 130 captures a subject image received via the optical system 110, to create image data. The created image data is digitized by an analog-to-digital converter (ADC) 140. The imaging element 130 operates at a timing controlled by a timing generator (TG) 150. The imaging element 130 creates image data of e.g. 30 frames or 60 frames per second, based on a signal of the timing generator 150, and the AD converter 140 digitizes those image data.

The imaging element 130 is e.g. a complementary metal oxide semiconductor (CMOS) image sensor or a charge coupled device (CCD) image sensor.

The controller 180 controls the constituent elements such as the imaging element 130 in response to instructions from a release button 210, to thereby control the overall actions of the digital camera 100. The controller 180 sends a vertical sync signal to the timing generator 150. In parallel with this, the controller 180 creates an exposure sync signal. During control actions or image processing actions, the controller 180 uses an internal memory 230 (including a dynamic random access memory (DRAM) or the like) as a work memory. The controller 180 performs various image processing on image data digitized by the AD converter 140. The various image processing is processing such as e.g. gamma correction processing, white balance correction processing, scratch correction processing, YC conversion processing, electronic zoom processing, or joint photographic experts group (JPEG) compression processing. The controller 180 creates a through image (moving image for live view display), an image for operation screen, etc.

The controller 180 may be a hard-wired electronic circuit or may be e.g. a microcomputer using a program. For example, the controller 180 may be a central processing unit (CPU), a field-programmable gate array (FPGA), an application specific integrated circuit (ASIC), or a digital signal processor (DSP).

The LCD monitor 220 displays an image subjected to image processing by the controller 180 or a through image, an operation screen, etc. created by the controller 180. The LCD monitor 220 has a touch sensor function. By the user performing a touch operation on the operation screen displayed on the LCD monitor 220, various settings can be made for the digital camera 100.

A memory card 200 can be fitted into the card slot 190. The card slot 190 controls the memory card 200, based on control from the controller 180. The digital camera 100 can store/read image data into/from the memory card 200.

Based on an instruction of the controller 180, the motion detector 310 divides a captured image represented as image data digitized by the AD converter 140, into a plurality of blocks to detect a motion vector for each block. Various methods such as pattern matching can be utilized to detect the motion vector. For example, a method (first method) of detecting one motion vector can be used by performing pattern matching on image data of adjacent frames for (whole of) each block. A method (second method) can also be utilized in which for each of small blocks (e.g. block of 16 pixels×16 pixels) smaller in size than each block, contained in each block, a motion vector is found for image data of adjacent frames so that an average value of a plurality of found motion vectors is used as the motion vector of each block. The first method or the second method may be used properly depending on the number of divisions of the image data (or the size of the divided blocks). For example, the second method may be used when the number of divisions is less than a predetermined number of divisions, whereas the first method may be used when the number of divisions is greater than the predetermined number of divisions.

1-2. Actions

A specific problem of the present disclosure will be described before describing actions of the digital camera 100 of this embodiment.

Figure 2:
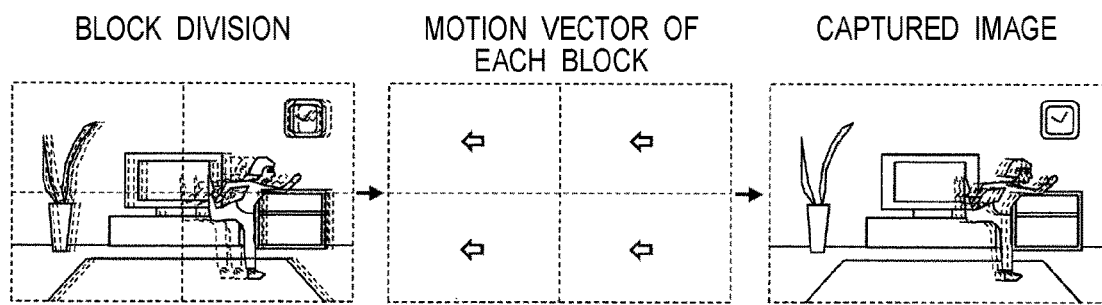
FIG. 2 is a view explaining a problem to be solved by the present disclosure.

FIG. 2 is a view explaining a problem of the present disclosure.

Conventionally, as shown in FIG. 2 for example, a captured image may be divided into 4 blocks of 2×2 to perform motion vector detection processing for each block after division. Then, a shutter speed may be determined based on a maximum value of the magnitudes of motion vectors detected for the blocks. FIG. 2 illustrates a situation where, while being swung to the right, the digital camera 100 shoots a girl running to the right. In such a situation, as shown in the figure on the left for example, assume that the background image of the girl's background, of the captured subject image, is flowing to the left, and that the image of the girl is flowing to the right. Here, with as less as 4 divisions as shown in FIG. 2, the ratio of the area of the girl's image to the area of one block is small. For that reason, the orientation and magnitude of the motion vector of each block is greatly affected by the flow (movement) of the background image, with the result that the magnitude approximates to the amount of movement of the background image. In other words, the situation of movement of the girl's image s not much reflected on the motion vector. Accordingly, in the case of determining the shutter speed based on the maximum value of the magnitudes of motion vectors detected for the blocks, the background image has no image blur but the girl's image undergoes blurring due to image blur, as shown in the captured image on the right.

In the device dividing the captured image into about 4 blocks to detect the motion vector of each block as described above, also e.g. when the digital camera 100 shoots the entire ballroom dance floor without being swung, persons performing ballroom dancing are more likely to be blurred due to image blur. Specifically, with as less as 4 divisions described above, since the persons are small compared to the entire floor, the ratio of the area of the persons' images to the area of one block is small. For that reason, if the floor image (background image) stands still for example even though a person is moving or rotating, the person's image is greatly affected by the stillness of the background image, so that a motion vector of the magnitude corresponding to the movement of the person cannot be detected. As a result, even if the shutter speed has been determined based on the maximum value of the magnitudes of motion vectors detected for the blocks, blurring occurs due to image blur in persons' images of the captured image. In the case where a region including a person(s) is cut out from the captured image to create an extended image, the blurring becomes more noticeable.

When an object image with an area smaller than that of the block is moving or rotating in this manner, the object image is greatly affected by the state of motion of the background image when detecting the motion vector, so that the motion vector corresponding to the motion of the object image cannot be detected. In consequence, simply by determining the shutter speed based on the maximum value of the magnitudes of motion vectors detected for the blocks, there still remains a problem that blurring occurs due to image blur in the object image of the captured image.

As one method to solve the above problem, it is conceivable to always set the shutter speed above a certain speed in the case of imaging an object that may move faster. However, if the shutter speed is faster than necessary, the gain needs to be increased to make up for the lack of light. As a result, noise is generated in the captured image. Furthermore, the motion of the object image loses its smoothness. To solve this problem, the present disclosure adopts the following configurations.

Figure 3:
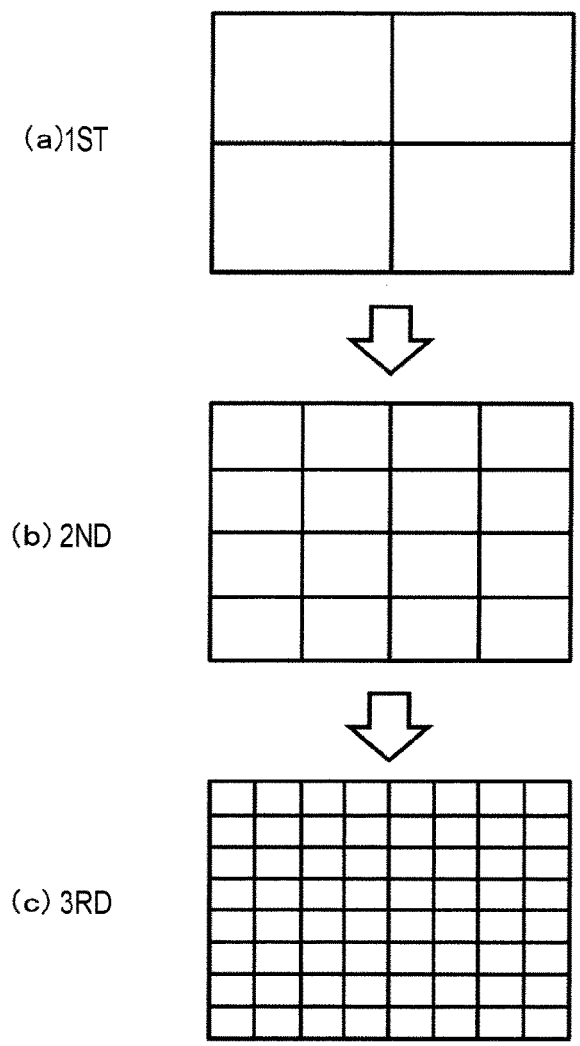
FIG. 3 is a view showing an example of shutter speed determining actions of the digital camera.

FIG. 3 is a view showing an example of a shutter speed determining action of the digital camera.

The controller 180 of the digital camera 100 performs the shutter speed determining actions of the present disclosure in real time e.g. when capturing a moving image for recording, or e.g. (when displaying a through image on the LCD monitor 220) before capturing a still image or a moving image. Specifically, when capturing a moving image, or (when displaying a through image on the LCD monitor 220) before capturing a still image or a moving image, the controller 180 of the digital camera 100 causes the motion detector 310 to perform the motion vector detection processing, on a block-to-block basis of a specified block size, for image data digitized by the AD converter 140. More specifically, the controller 180 causes the motion detector 310 to repeat the motion vector detection processing while reducing the block size until the motion vector of the moving object is properly acquired. For example, as shown in FIGS. 3(a), 3(b), and 3(c), the block size is gradually reduced in the first and subsequent the second and the third motion vector detection processing. Each time executing the detection processing, the controller 180 finds a motion vector related value that changes in the same direction as the direction in which the magnitude of the motion vector changes. Based on the found motion vector related value, the controller 180 determines the shutter speed used when capturing the subject image thereafter. Specifically, when the amount of increase of the motion vector related value found in the current detection processing with respect to the motion vector related value found in the most recent motion vector detection processing becomes less than or equal to a threshold value, the controller 180 determines the shutter speed based on the motion vector related value found in the current motion vector detection processing.

Figure 4:
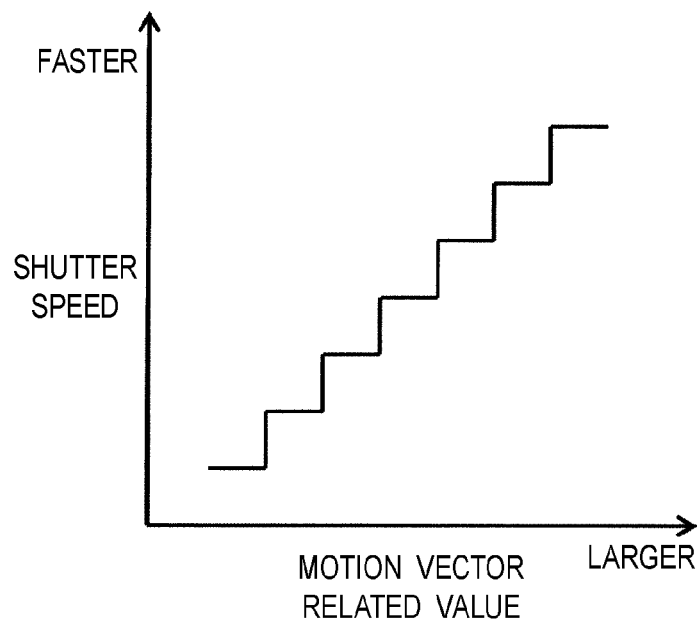
FIG. 4 is a view showing the relationship between a motion vector related value and a shutter speed.

FIG. 4 is a view showing an example of the relationship between the motion vector related value and the shutter speed.

As shown in FIG. 4, the controller 180 of the digital camera 100 determines a faster shutter speed according as the motion vector related value increases.

The motion vector related value can be e.g. values such as (1), (2), and (3):

(1) a maximum value of the magnitudes of motion vectors detected for the blocks;

(2) an average value of the magnitudes of motion vectors having upper-ranked magnitudes among motion vectors detected for the blocks; and (3) a middle value of the magnitudes of motion vectors having upper-ranked magnitudes among motion vectors detected for the blocks, where "upper rank" of (2) and (3) means "predetermined number from the top", "predetermined rate from the top", or "the magnitude of motion vector is greater than or equal to a predetermined value", any one of which may be used.

Figure 5:
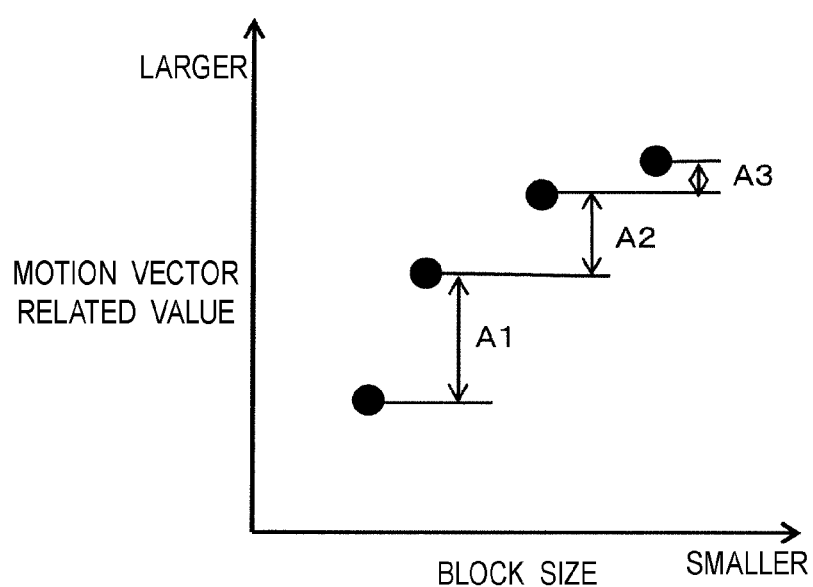
FIG. 5 is a view showing an example of the relationship between the motion vector related value and the shutter speed.

FIG. 5 is a view showing the relationship between the block size and the motion vector related value.

In the case where a captured image contains an object image of an area relatively small compared to the area of the captured image, the motion vector related value becomes larger according as the block size is reduced as shown in FIG. 5. This is because the ratio of the area of the object image to the area of the block increases according as the block sized is reduced. However, the amount of increase as a difference gradually decreases like A1, A2, A3, etc. This means that the size of the detected motion vector is approaching the size of the motion vector corresponding to the actual movement of the object image. For that reason, when the amount of increase falls below a predetermined threshold, reducing the block size is stopped to estimate the motion vector related value at this time as the motion vector related value corresponding to the actual motion of the object image. Then, the shutter speed is determined based on this motion vector related value. The threshold value is set in consideration e.g. of: the size of an object image desired to detect the motion vector thereof in a captured image; the speed at which the object image moves; or the visually permissible amount of blurring of the object image in the captured image. Since too small threshold value results in being susceptible to noise generated on a captured image, the threshold value may be set less likely to be susceptible to noise.

Although in FIG. 3 described above, the number of block divisions is increased like 2×2=4 divisions, 4×4=16 divisions of, and 8×8=16 divisions, this is a mere example. Other number of divisions may be employed like, e.g. 2×2=4 divisions, 3×3=9 divisions, 4×4=16 divisions, and 5×5=25 divisions. The number of divisions in the horizontal direction and the number of divisions in the vertical direction may differ. The minimum block size may be a macroblock size of 8 pixels×8 pixels or may be a block size larger than that.

The timing for determining the shutter speed can be set to an appropriate timing. In the case where e.g. 30 frames of image data per second is created, the motion vector detection processing may be performed for one frame of image data while reducing the block size repeatedly, to determine a shutter speed for each one frame. Alternatively, performing the motion vector detection processing once with a certain block size for one frame of image data may be repeated over several frames while reducing the block size, to determine the shutter speed for each several frames. According to the former, the next frame can be imaged at the determined shutter speed, so that an even fast-moving object can be imaged with greatly suppressed blurring. According to the latter, the load of the motion vector detection processing can be reduced. In the case of the latter, the next frame may be imaged at the determined shutter speed, or e.g. at a first frame of the next second, the shutter speed may be changed to the determined shutter speed to image the first frame.

Figure 6:
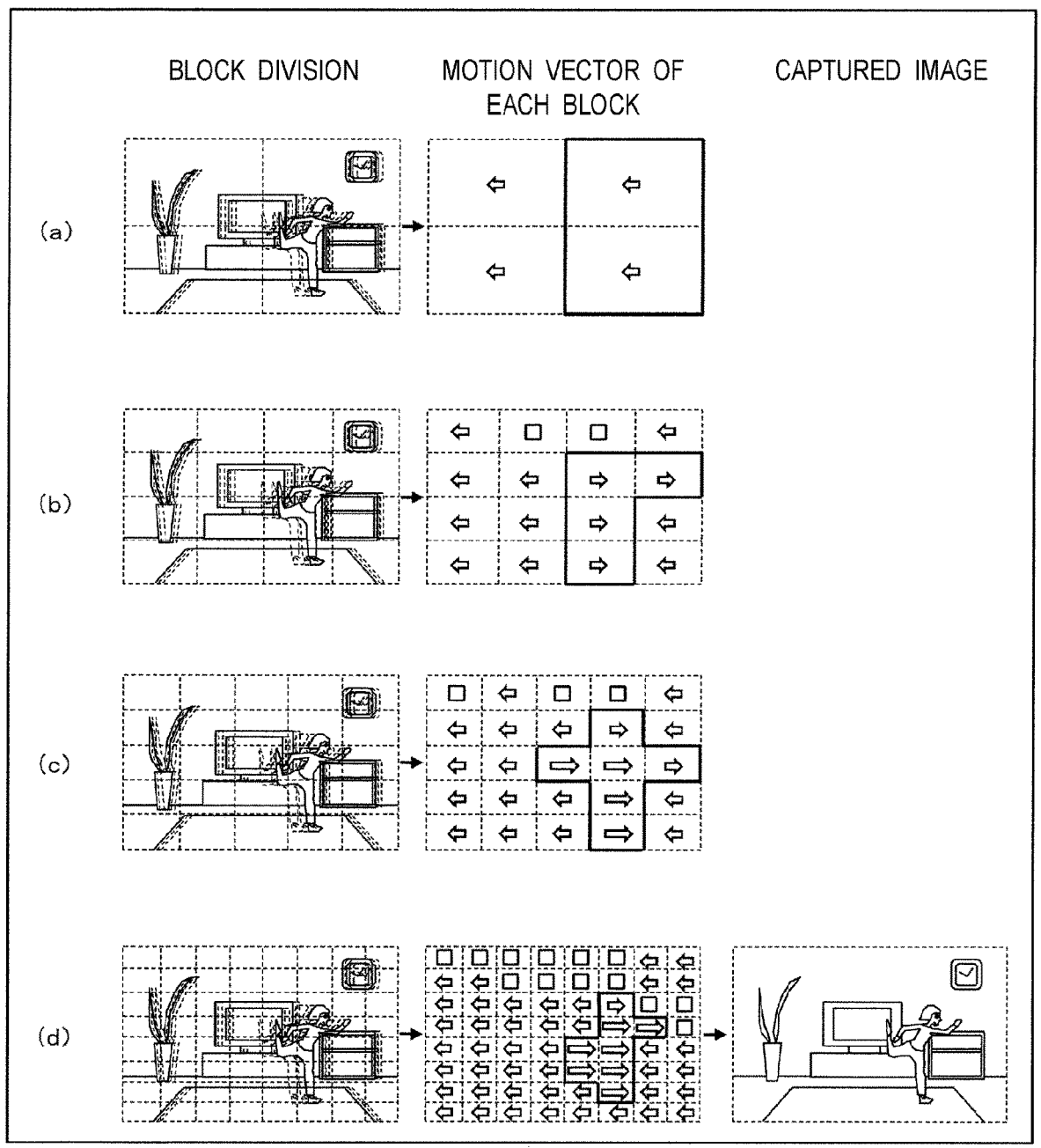
FIG. 6 is a view explaining a specific example of shutter speed determination processing of the present disclosure.

Referring next to FIG. 6, a specific example of shutter speed determination processing will be described.

FIG. 6 is a view explaining the specific example of the shutter speed determination processing of the present disclosure.

In this specific example, an example will be described where the motion vector related value is a maximum value of the magnitudes of detected motion vectors. Although description is given to the above former case (the case where the motion vector detection processing is performed for one frame of image data while reducing the block size repeatedly, to determine a shutter speed for each one frame), it is also applicable to the latter case (the case where the motion vector detection processing is performed for one frame of image data while reducing the block size by only one level, to determine the shutter speed for each several frames).

First, as illustrated in FIG. 6(a), the controller 180 divides a captured image into e.g. 2×2=4 blocks, to cause the motion detector 310 to perform the motion vector detection processing for each block after division. The controller 180 sets, as the motion vector-related value, a maximum value of the magnitudes of motion vectors detected for the blocks. In FIGS. 6(a) to 6(d), similarly to FIG. 2, situations are illustrated where a girl is running to the right with the digital camera 100 being swung to the right. With as less as 4 divisions as shown in FIG. 6(a), the ratio of the area of the girl's image to the area of one block is small. For that reason, the orientation and magnitude of the motion vector detected in each block is greatly affected by the motion of the background image, with the result that the magnitude approximates to the amount of leftward movement of the background image. Although the magnitudes of motion vectors of these blocks are substantially the same, it is presumed that the magnitudes of motion vectors of upper left or lower left blocks not containing the girl's image have the maximum value.

Next, as illustrated in FIG. 6(b), the controller 180 divides a captured image into 4×4=16 blocks, to cause the motion detector 310 to perform the motion vector detection processing for each block after division. The controller 180 finds a maximum value of the magnitudes of motion vectors detected for the blocks. When divided finely into of the order of 16 divisions as in FIG. 6(b), the ratio of the area of the girl's image to the area of one block increases, allowing blocks containing the girl's image to have rightward motion vectors. At this time, it is presumed that the motion vector of any block of blocks containing the girl's image has a maximum value. Quadrangular (not arrow) indications in background blocks designate no change in the background image within the block, i.e. no detection of the motion vector. The controller 180 compares the motion vector maximum value detected in FIG. 6(a) to the motion vector maximum value detected in FIG. 6(b), to find the amount of increase in the maximum value to determine whether the amount of increase in the maximum value is less than or equal to a threshold value. Here, it is assumed that the amount of increase in the maximum value is not less than or equal to the threshold value.

Next, as illustrated in FIG. 6(c), the controller 180 divides a captured image into 5×5=25 blocks, to cause the motion detector 310 to perform the motion vector detection processing for each block after division. The controller 180 finds a maximum value of the magnitudes of motion vectors detected for the blocks. When divided finely into of the order of 25 divisions as in FIG. 6(c), the ratio of the area of the girl's image to the area of one block further increases compared to the case of FIG. 6(b). For that reason, the magnitudes of motion vectors of blocks containing the girl's image become greater than the case of FIG. 6(b). At this time, it is presumed that the motion vector of any block of blocks containing the girl's image has a maximum value. The controller 180 compares the motion vector maximum value detected in FIG. 6(b) to the motion vector maximum value detected in FIG. 6(c), to find the amount of increase in the maximum value to determine whether the amount of increase in the maximum value is less than or equal to a threshold value. Here, it is assumed that the amount of increase in the maximum value is not less than or equal to the threshold value.

Next, as illustrated in FIG. 6(d), the controller 180 divides a captured image into 8×8=64 blocks, to cause the motion detector 310 to perform the motion vector detection processing for each block after division. The controller 180 finds a maximum value of the magnitudes of motion vectors detected for the blocks. When divided finely into of the order of 64 divisions as in FIG. 6(d), the ratio of the area of the girl's image to the area of one block further increases compared to the case of FIG. 6(c). For that reason, the magnitudes of motion vectors of blocks containing the girl's image become greater than the case of FIG. 6(c). At this time, it is presumed that the motion vector of any block of blocks containing the girl's image has a maximum value. However, the way the maximum value increases is slowing down. The controller 180 compares the motion vector maximum value detected in FIG. 6(c) to the motion vector maximum value detected in FIG. 6(d), to find the amount of increase in the maximum value to determine whether the amount of increase in the maximum value is less than or equal to a threshold value. Here, it is assumed that the amount of increase in the maximum value is less than or equal to the threshold value. In this case, the controller 180 determines the shutter speed corresponding to the motion vector related value in accordance with the relationship shown in FIG. 4, allowing the imaging sensor to perform the subsequent imaging at the determined shutter speed. It is thus possible to capture, with suppressed image blur and reduced blurring, a girl's image having a small ratio of area to the area of the captured image and moving at the fastest velocity within the captured image.

The flow of the above shutter speed determination processing will be described with reference to FIG. 7.

Figure 7:
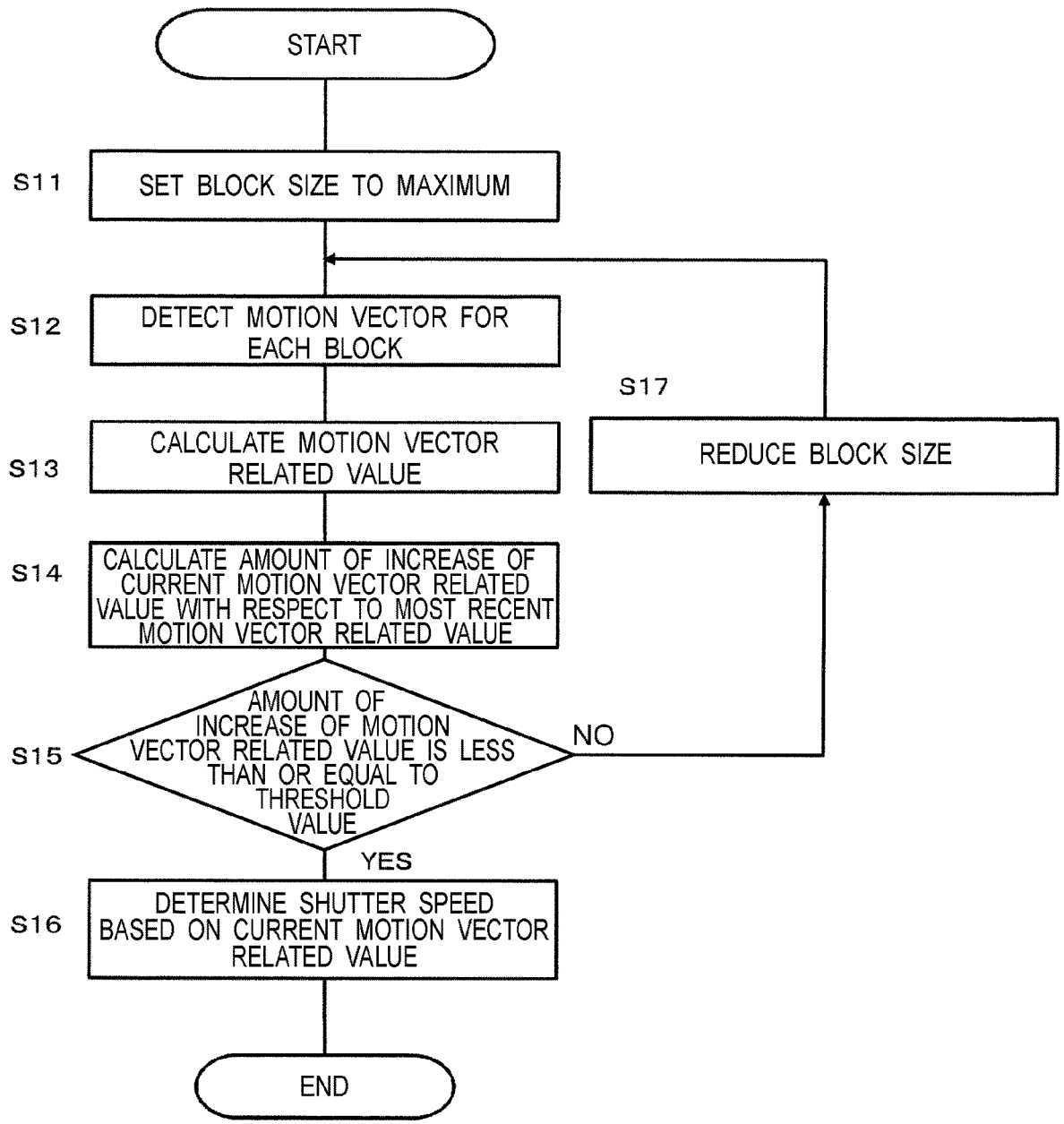
FIG. 7 is a flowchart explaining the shutter speed determining actions.

FIG. 7 is a flowchart explaining the shutter speed determining actions.

The controller 180 sets the block size to its maximum value (S11). This also means that the number of block divisions is set to its minimum value.

The controller 180 causes the motion detector 310 to detect a motion vector for each block (S12).

The controller 180 finds a motion vector related value at the current block size, based on the motion vector detected for each block (S13).

The controller 180 finds the amount of increase of the motion vector related value found currently (at the current control cycle) with respect to the motion vector related value found most recently (in the last control cycle)(S14). Since at the first time (first control cycle), the most recent motion vector related value does not exist, the controller 180 finds the amount of increase on the assumption that the most recent motion vector related value is 0 (zero).

The controller 180 determines whether the amount of increase of the motion vector related value is less than or equal to a threshold value (S15).

If the amount of increase of the motion vector related value is not less than or equal to the threshold value (NO at S15), the controller 180 sets the block size to a block size smaller than the current block size (S17), to execute the processes after step S12. How to reduce the block size can be set arbitrarily as described above.

If the amount of increase of the motion vector related value is less than or equal to the threshold value (YES at S15), the controller 180 determines the shutter speed, based on the currently found motion vector related value (S16). Specifically, the controller 180 determines the shutter speed corresponding to the motion vector related value, in accordance with the relationship shown in FIG. 4.

1-3. Effects, Etc

As set forth hereinabove, the digital camera 100 (an example of the shutter speed determination device) of this embodiment comprises: the motion detector 310 performing motion vector detection processing, on a block-to-block basis of a specified block size, for image data obtained by capturing a subject image; and the controller 180 (an example of a control unit) causing the motion detector 310 to repeatedly execute the detection processing while reducing the block size, to find, each time executing the detection processing, a motion vector related value that changes in the same direction as the direction in which the magnitude of the motion vector changes, the controller 180 determining a shutter speed used when capturing the subject image thereafter, based on the found motion vector related value.

According to the digital camera 100 of this embodiment having such a configuration, blurring of a moving subject can be reduced in case of detecting motion vectors to determine the shutter speed.

In this embodiment, when the amount of increase of the motion vector related value found in the current detection processing with respect to the motion vector related value found in the most recent detection processing becomes less than or equal to a threshold value, the controller 180 determines the shutter speed based on the motion vector related value found in the current detection processing. This enables blurring of the subject to be properly suppressed below a certain level in accordance with the threshold value.

In this embodiment, the motion vector related value may be a maximum value of the magnitudes of motion vectors detected for the blocks. This enables a subject moving at a fast speed in a captured image to be imaged without blurring.

In this embodiment, the motion vector related value may be an average value of the magnitudes of motion vectors having upper-ranked magnitudes among motion vectors detected for the blocks. Consequently, in the case where motion vectors detected for blocks include e.g. a motion vector with incorrect pattern matching at the time of detection of the motion vectors, whose magnitude becomes a maximum value, it is suppressed that the shutter speed is determined based on the wrong maximum value. By determining the shutter speed based on the average value of the magnitudes of motion vectors having upper-ranked magnitudes, subject motion blur in the captured image can be substantially eliminated.

In this embodiment, the motion vector related value may be a middle value of the magnitudes of motion vectors having upper-ranked magnitudes among motion vectors detected for the blocks. As a result, in the case where motion vectors detected for blocks include e.g. a motion vector with incorrect pattern matching at the time of detection of the motion vectors, whose magnitude becomes a maximum value, it is suppressed that the shutter speed is determined based on the wrong maximum value. By determining the shutter speed based on the middle value of the magnitudes of motion vectors having upper-ranked magnitudes, subject motion blur in the captured image can be substantially eliminated.

Second Embodiment

Although in the first embodiment the configuration has been described where motion vectors are detected for all blocks within a captured image, description of a second embodiment will be given of a configuration in which motion vectors are detected for some blocks narrowed down from all the blocks. Note that differences from the first embodiment will mainly be described.

2-1. Configuration

The digital camera 100 of this embodiment includes the same hardware as that of the first embodiment. Therefore, description of the hardware configuration will be omitted.

2-2. Actions

Figure 8:
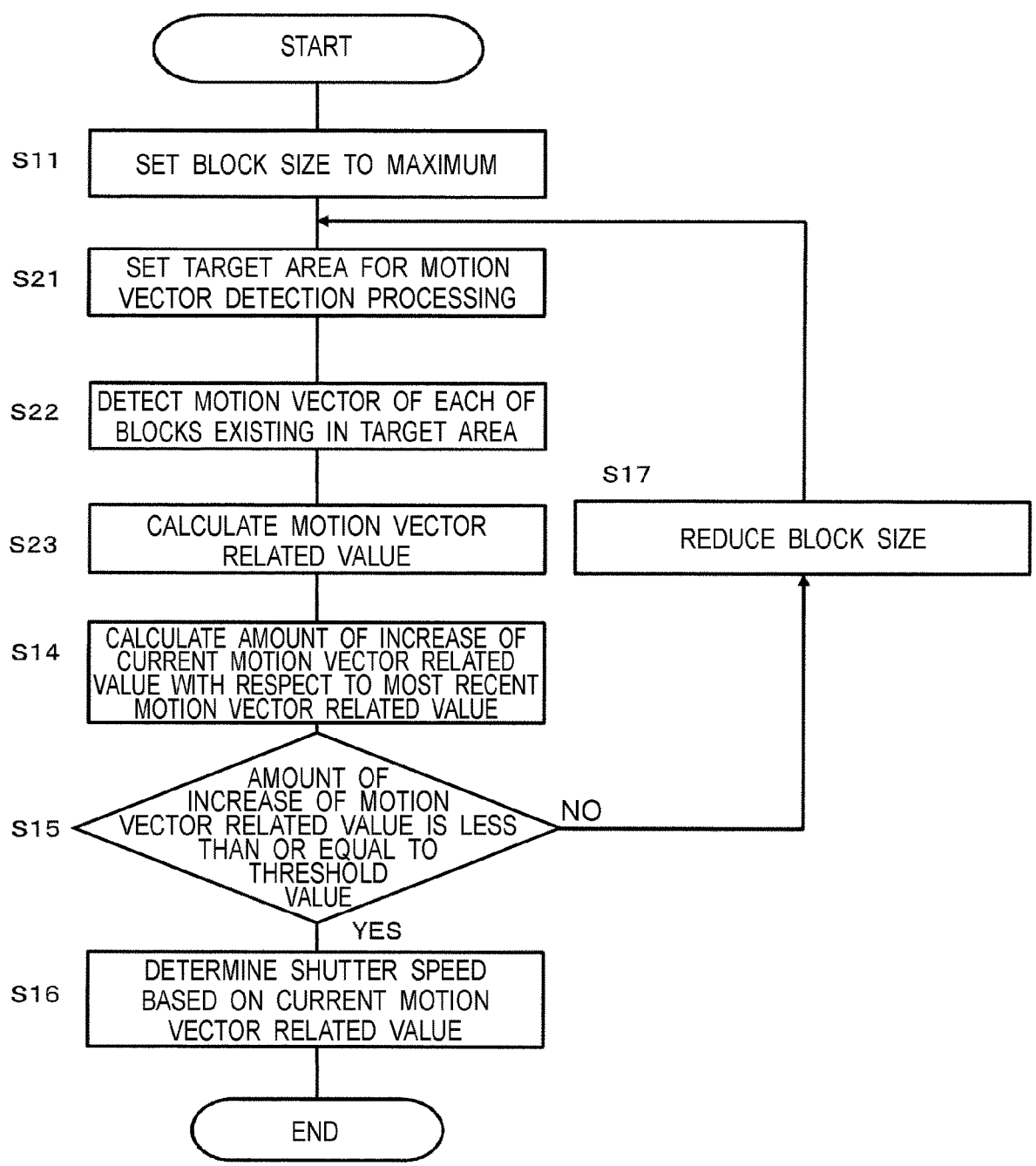
FIG. 8 is a flowchart explaining the shutter speed determining actions of a second embodiment.

FIG. 8 is a flowchart explaining the shutter speed determining actions. In FIG. 8, the same step numbers are imparted to the same steps as in the first embodiment.

The controller 180 sets the block size to its maximum value (S11) and sets a target area for the motion vector detection processing (S21). A method of setting a target area for motion vector detection processing will be detailed later.

The controller 180 causes the motion detector 310 to detect a motion vector for each of blocks existing in the target area (S22).

The controller 180 finds a motion vector related value at the current block size, based on the motion vectors detected for the blocks existing in the target area (S23).

After the execution of step S23, the controller 180 executes the same processes as in the first embodiment at step S14 and subsequent steps.

First to third examples of the method of setting a target area for motion vector detection processing at step S21 will then be described.

First Example

The controller 180 sets, as the target area for the current (current control cycle's) motion vector detection processing, only the area containing blocks in which motion vectors having upper-ranked magnitudes have been detected among motion vectors detected most recently (in the last control cycle). "Upper rank" refers to e.g. "predetermined number from the top", "predetermined rate (%) from the top", or "the magnitude of motion vector is greater than or equal to a predetermined value". The same applies to "upper-ranked" of the second and third examples. The values of the predetermined number, the predetermined rate (%), etc. defining "upper rank" herein may differ from the values defining "upper rank" when finding the average value or the middle value of the motion vectors.

Figure 9:
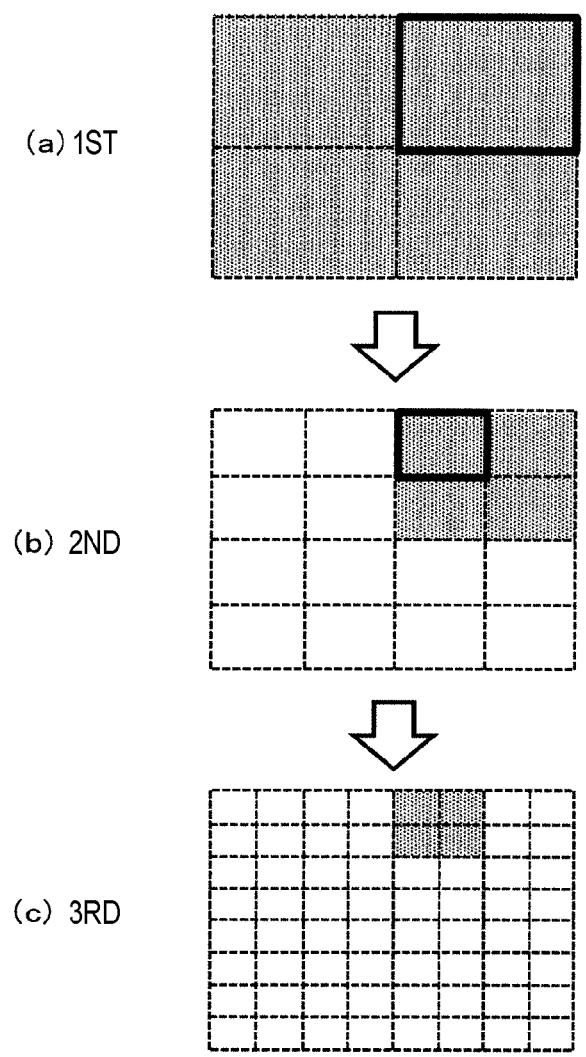
FIG. 9 is a view explaining a first example of a method of setting a target area for motion vector detection processing.

FIG. 9 is a view explaining the first example of the method of setting a target area for motion vector detection processing. It is assumed in the first to third examples that the minimum value of the number of block divisions is set to 4. It is also assumed that the upper rank is one from the top. It is further assumed that one block is divided into 4 blocks when reducing the block size.

In first motion vector detection processing, the controller 180 causes the motion detector 310 to perform motion vector detection processing for each of the 4 blocks of FIG. 9(a). It is assumed at this time that a motion vector having an upper-ranked magnitude has been detected in one block enclosed with a solid line in FIG. 9(a). In this case, the controller 180 sets the area of this one block as the target area for the second motion vector detection processing.

In second motion vector detection processing, as shown in FIG. 9(b), the controller 180 reduces the block size and causes the motion detector 310 to perform the motion vector detection processing for only 4 blocks (shaded blocks) existing in the target area.

At this time, the controller 180 determines whether the amount of increase of the motion vector related value at the block size of FIG. 9(b), with respect to the motion vector related value at the block size of FIG. 9(a), is less than or equal to a threshold value. It is assumed here that the amount of increase of the motion vector related value is not less than or equal to the threshold value. In this case, the controller 180 sets, as the target area for the third motion vector detection processing, the area (enclosed with a solid line) of one block in which a motion vector having the upper-ranked magnitude has been detected in FIG. 9(b).

In third motion vector detection processing, as shown in FIG. 9(c), the controller 180 reduces the block size and causes the motion detector 310 to perform the motion vector detection processing for only 4 blocks (shaded blocks) existing in the target area.

At this time, the controller 180 determines whether the amount of increase of the motion vector related value at the block size of FIG. 9(c), with respect to the motion vector related value at the block size of FIG. 9(b), is less than or equal to a threshold value. It is assumed here that the amount of increase of the motion vector related value is less than or equal to the threshold value. In this case, the controller 180 determines the shutter speed used when imaging thereafter, based on the motion vector related value at the block size of FIG. 9(c). On the contrary, if the amount of increase of the motion vector related value is not less than or equal to the threshold value, the controller 180 sets, as the target area for the next motion vector detection processing, the area of one block in which a motion vector having the upper-ranked magnitude has been detected, and further reduces the block size to cause the motion detector 310 to perform the motion vector detection processing for only 4 blocks existing in the target area.

Second Example

The controller 180 sets, as the target area for the current (current control cycle's) motion vector detection processing, only the area containing a block in which a motion vector having the upper-ranked magnitude has been detected among motion vectors detected most recently (in the last control cycle), and blocks in the vicinity of the block. The blocks in the vicinity refers to e.g. blocks existing around and adjacent to the block in which a motion vector having the upper-ranked magnitude has been detected.

Figure 10:
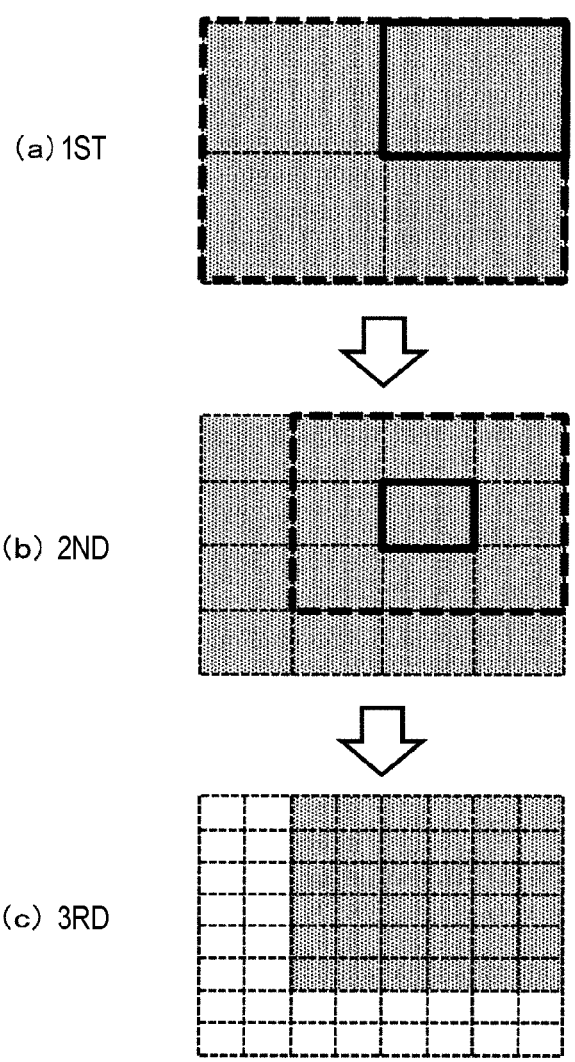
FIG. 10 is a view explaining a second example of the method of setting a target area for the motion vector detection processing.

FIG. 10 is a view explaining a second example of the method of setting a target area for the motion vector detection processing.

In first motion vector detection processing, the controller 180 causes the motion detector 310 to perform motion vector detection processing for each of 4 blocks of FIG. 10(a). It is assumed at this time that a motion block having the upper-ranked magnitude has been detected in one block enclosed with a solid line in FIG. 10(a). In this case, the controller 180 sets, as the target area for the second motion vector detection processing, the area (area enclosed with a thick broken line) containing this one block and blocks existing adjacent thereto.

In second motion vector detection processing, as shown in FIG. 10(b), the controller 180 reduces the block size and causes the motion detector 310 to perform the motion vector detection processing for 16 blocks (shaded blocks) existing in the target area.

At this time, the controller 180 determines whether the amount of increase of the motion vector related value at the block size of FIG. 10(b), with respect to the motion vector related value at the block size of FIG. 10(a), is less than or equal to a threshold value. It is assumed here that the amount of increase of the motion vector related value is not less than or equal to the threshold value. In this case, the controller 180 sets, as the target area for the third motion vector detection processing, the area (enclosed with a thick broken line) containing one block (block enclosed with a solid line) in which a motion vector having the upper-ranked magnitude has been detected in FIG. 10(b) and blocks existing adjacent thereto.

In third motion vector detection processing, as shown in FIG. 10(c), the controller 180 reduces the block size and causes the motion detector 310 to perform the motion vector detection processing for only 36 blocks (shaded blocks) existing in the target area.

At this time, the controller 180 determines whether the amount of increase of the motion vector related value at the block size of FIG. 10(c), with respect to the motion vector related value at the block size of FIG. 10(b), is less than or equal to a threshold value. It is assumed here that the amount of increase of the motion vector related value is less than or equal to the threshold value. In this case, the controller 180 determines the shutter speed used when imaging thereafter, based on the motion vector related value at the block size of FIG. 10(c). On the contrary, if the amount of increase of the motion vector related value is not less than or equal to the threshold value, the controller 180 sets, as the target area for the next motion vector detection processing, the area containing one block in which a motion vector having the upper-ranked magnitude has been detected and blocks existing adjacent thereto, and further reduces the block size to cause the motion detector 310 to perform the motion vector detection processing for only blocks existing in the target area.

Third Example

The controller 180 averages, on an area-by-area basis corresponding to a block of the second most recent block size, the magnitudes of motion vectors detected by the most recent (last control cycle's) detection processing, and finds, for each area, a difference between an average value of each area obtained by averaging and the magnitude of the motion vector of each block detected by the second most recent (second last control cycle's) detection processing, to set only an area having an upper-ranked difference among the found differences, as the target area for the current (current control cycle's) motion vector detection processing.

Figure 11:
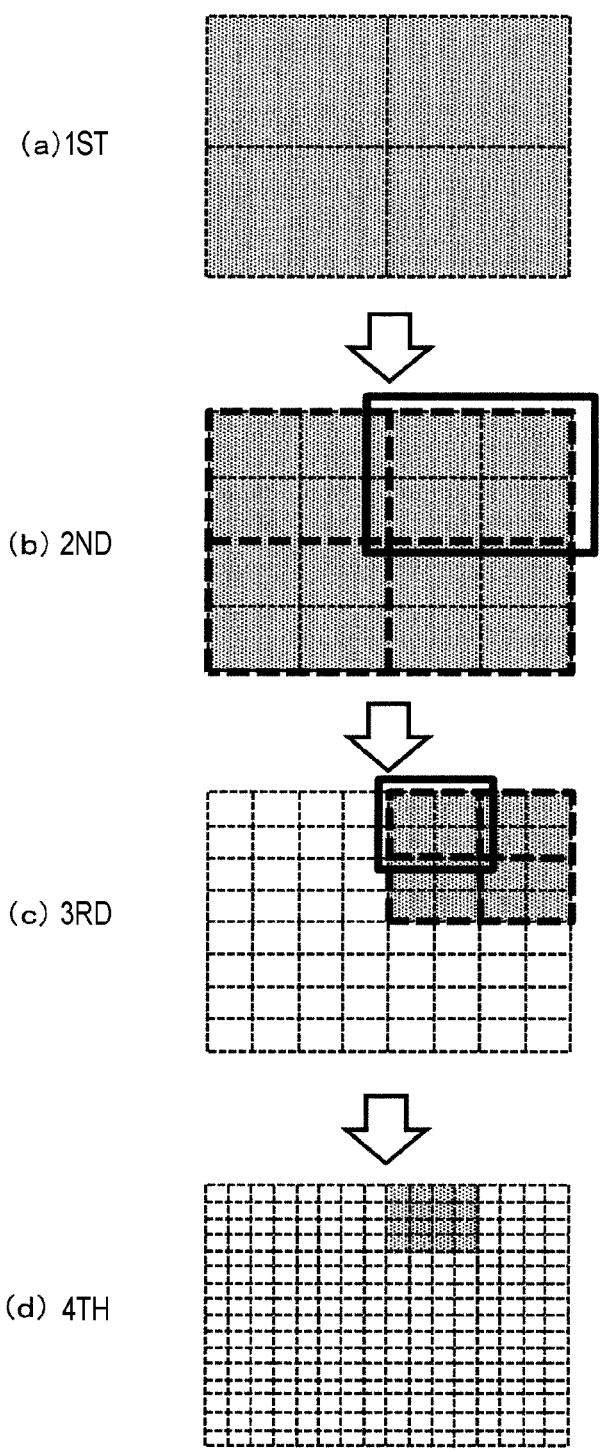
FIG. 11 is a view explaining a third example of e method of setting a target area for the motion vector detection processing.

FIG. 11 is a view explaining a third example of the method of setting a target area for the motion vector detection processing.

In first motion vector detection processing, the controller 180 causes the motion detector 310 to perform the motion vector detection processing for each of 4 blocks of FIG. 11(a).

In second motion vector detection processing, as shown in FIG. 11(b), the controller 180 reduces the block size and causes the motion detector 310 to perform the motion vector detection processing for each of 16 blocks.

The controller 180 averages, on an area-by-area basis corresponding to blocks with the first block size, the magnitudes of motion vectors detected by the second motion vector detection processing, to find, for each area, an average value of the magnitudes of motion vectors of blocks within each area. For example, as indicated by a thick broken line in FIG. 11(b), 4 blocks existing in an area corresponding to the first block size are grouped on an area (group) basis, to find, for each area (group), an average value of the magnitudes of the motion vectors of the 4 blocks within each area. The controller 180 finds a motion vector related value, based on the average value obtained for each area.

The controller 180 determines whether the amount of increase of the motion vector related value at the block size of FIG. 11(b), with respect to the motion vector related value at the block size of FIG. 11(a), is less than or equal to a threshold value. It is assumed here that the amount of increase of the motion vector related value is not less than or equal to the threshold value. In this case, the controller 180 finds, for each area, a difference between an average value of each area obtained by averaging the magnitudes of motion vectors detected by the second detection processing on an area-by-area basis corresponding to the block of the first block size and the magnitude of the motion vector of each block detected by the first detection processing. The controller 180 sets, as the target area for third motion vector detection processing, one area (area enclosed with a solid line) having an upper-ranked difference.

In the third motion vector detection processing, as shown in FIG. 11(c), the controller 180 reduces the block size and causes the motion detector 310 to perform the motion vector detection processing for only 16 blocks (shaded blocks) existing in the target area.

The controller 180 averages the magnitudes of motion vectors detected by the third motion vector detection processing on an area-by-area basis corresponding to the block of the second block size, to find for each area an average value of the magnitudes of the motion vectors in each area. For example, as indicated by thick broken lines in FIG. 11(c), the controller 180 groups 4 blocks existing in the area corresponding to the second block size on an area (group) basis, to find, for each area (group), an average value of the magnitudes of motion vectors of the 4 blocks in each area. The controller 180 finds a motion vector related value, based on the average value obtained for each area.

The controller 180 determines whether the amount of increase of the motion vector related value at the block size of FIG. 11(c), with respect to the motion vector related value at the block size of FIG. 11(b), is less than or equal to a threshold value. It is assumed here that the amount of increase of the motion vector related value is less than or equal to the threshold value. In this case, the controller 180 determines the shutter speed used when imaging thereafter, based on the motion vector related value at the block size of FIG. 11(c). If the amount of increase of the motion vector related value is not less than or equal to the threshold value, the controller 180 finds, for each area, a difference between an average value of each area obtained by averaging the magnitudes of motion vectors detected by the third detection processing on an area-by-area basis corresponding to the block of the second block size and the magnitude of the motion vector of each block detected by the second detection processing. The controller 180 sets, as the target area for fourth motion vector detection processing, one area (area enclosed with a solid line) having an upper-ranked difference, and, as shown in FIG. 11(d), reduces the block size to cause the motion detector 310 to perform the fourth motion vector detection processing for only 16 blocks (shaded blocks) existing in the target area.

2-3. Effects, Etc

In this embodiment, the controller 180 (an example of the control unit) sets, as the target area for the current detection processing, only the area of a block in which a motion vector having an upper-ranked magnitude has been detected among motion vectors detected in the most recent detection processing. In consequence, the load of motion detection processing in the motion detector 310 can be relieved.

In this embodiment, the controller 180 (an example of the control unit) sets, as the target area for the current detection processing, only an area containing a block in which a motion vector having an upper-ranked magnitude has been detected among motion vectors detected in the most recent detection processing, and blocks in the vicinity thereof. In consequence, the load of motion detection processing in the motion detector 310 can be relieved, Since the motion vector detection target contains also blocks in the vicinity of a block in which a motion vector having an upper-ranked magnitude has been detected, loss of sight of very fast-moving objects can be suppressed. For that reason, object image blur and blurring on the captured image can be suppressed more appropriately.

In this embodiment, the controller 180 (an example of the control unit) averages, on an area-by-area basis corresponding to a block of the second most recent block size, the magnitudes of motion vectors detected by the most recent detection processing, and finds, for each area, a difference between an average value of each area obtained by averaging and the magnitude of the motion vector of each block detected by the second most recent detection processing, to set only an area having an upper-ranked difference among the found differences, as the target area for the current motion vector detection processing. Consequently, the load of motion detection processing in the motion detector 310 can be relieved.

Third Embodiment

In a third embodiment, a predetermined-object image is detected in a captured image so that motion vectors are detected only for blocks containing the predetermined-object image. The predetermined-object is an object to be detected in the captured image, e.g. an object such as a person, an animal, or an automobile. What object is the predetermined-object may be set arbitrarily in accordance with the purpose. Hereinafter, differences from the first and second embodiments will mainly be described.

3-1. Configuration

Figure 12:
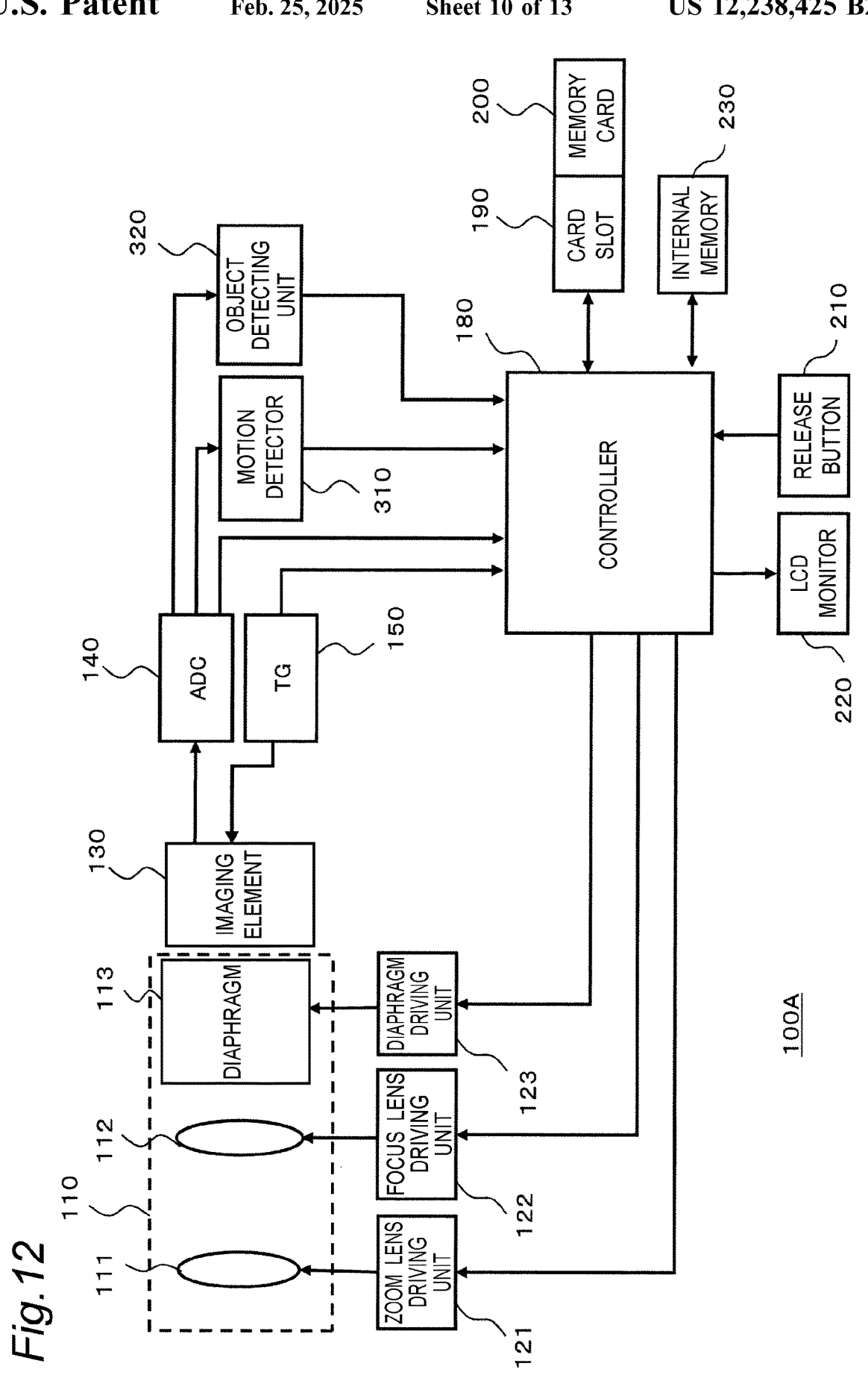
FIG. 12 is a view showing a configuration of a digital camera of a third embodiment.

FIG. 12 is a view showing a configuration of a digital camera 100A of a third embodiment.

The digital camera 100A of the third embodiment further includes an object detecting unit 320. The object detecting unit 320 detects a predetermined-object image, based on image data digitized by the AD converter 140 and outputs a signal indicative of a block containing the predetermined-object image to the controller 180.

3-2. Actions

The controller 180 performs shutter speed determining actions in accordance with the flowchart of FIG. 8 described in the second embodiment. At step S21, the controller 180 causes the object detecting unit 320 to detect the predetermined-object image contained in the captured image represented by image data digitized by the AD converter 140, allowing output of a signal identifying a block containing the predetermined-object image. Then, based on this signal, the controller 180 sets, as the target area for the motion vector detection processing, only the area of a block containing the predetermined-object image. The other processes are carried out in the same manner as in the second embodiment.

Figure 13:
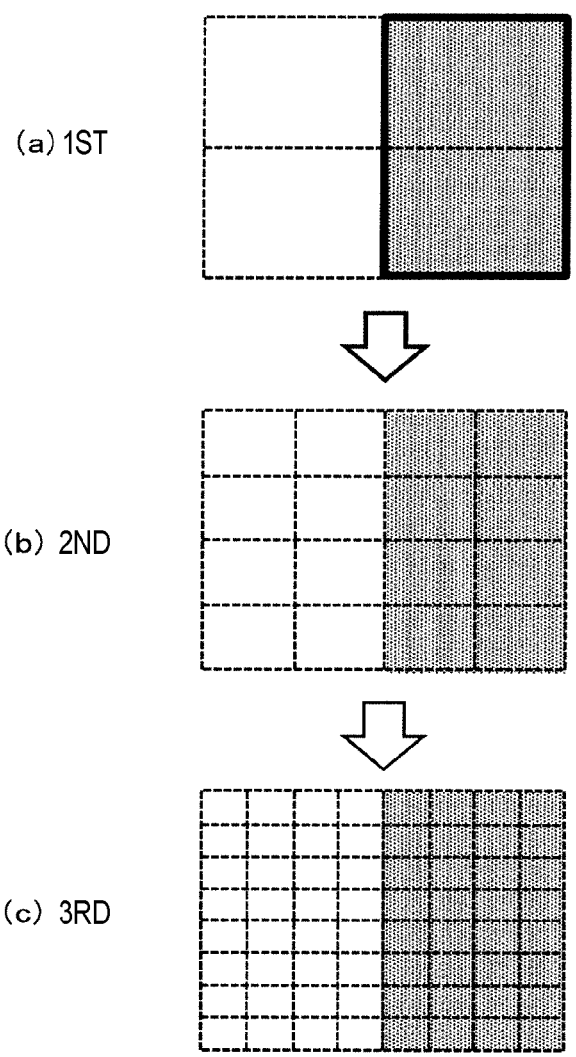
FIG. 13 is a view explaining an example of the method of setting a target area for the motion vector detection processing.

FIG. 13 is a view explaining an example of the method of setting a target area for the motion vector detection processing.

In the case where the minimum value of the number of block divisions is set to 4, as shown in FIG. 13(a), assume that the object detecting unit 320 has detected a predetermined-object image in two blocks enclosed with a solid line. In this case, for only the area of these 2 blocks, the controller 180 executes the motion vector detection processing and the motion vector related value calculation processing repeatedly while reducing the block size as shown in FIGS. 13(b) and 13(c), to find the amount of increase of the motion vector related value. Then, when the amount of increase of the motion vector related value becomes less than or equal to the threshold value, the controller 180 determines the shutter speed, based on the current motion vector related value.

3-3. Effects, Etc

In this embodiment, the object detecting unit 320 (an example of a predetermined-object detecting unit) is disposed that detects a predetermined-object image contained in a captured image represented by image data, the controller 180 (an example of the control unit) causing the motion detector 310 to execute the detection processing for only area of a block containing the predetermined-object image. In consequence, the load of motion detection processing in the motion detector 310 can be relieved. Furthermore, the motion vectors of the predetermined-object image can be detected properly. For that reason, blur of predetermined-object mage and blurring on the captured image can be suppressed more properly.

Fourth Embodiment

In this embodiment, a mode will be described in which the shutter speed determination device according to the present disclosure is applied to external equipment.

Figure 14:
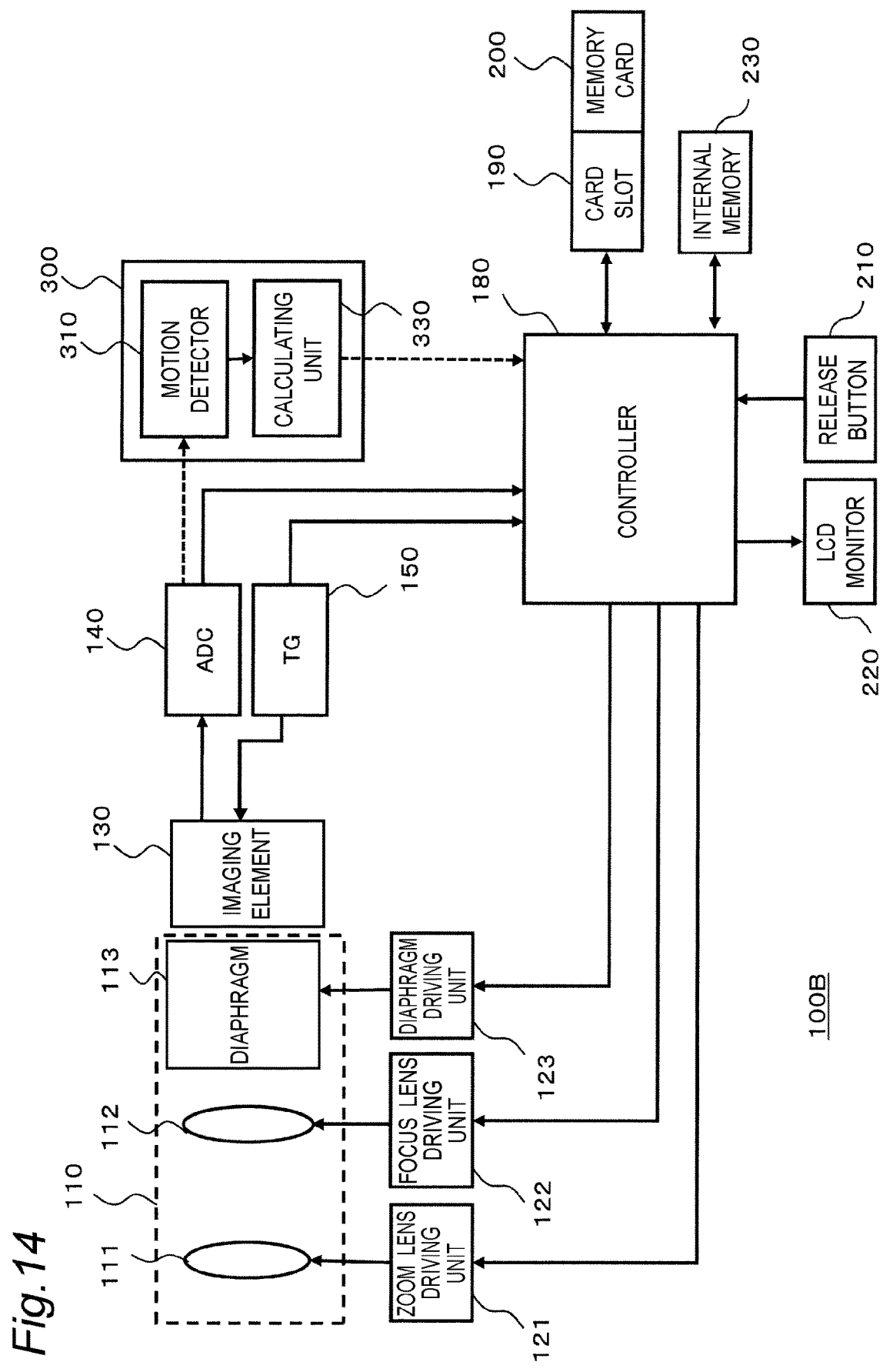
FIG. 14 is a view showing a configuration of external equipment of a fourth embodiment.

FIG. 14 is a view showing a configuration of the external equipment of a fourth embodiment.

External equipment 300 includes the motion detector 310 and a calculating unit 330. The external equipment 300 may be external optional equipment or an external computer that can be retrofitted or connected to a digital camera. The motion detector 310 and the calculating unit 330 of the external equipment 300 may be a hard-wired electronic circuit, or a CPU that executes processing based on program commands. The motion detector 310 inputs image data digitized by the AD converter 140 of a digital camera 100B and detects motion vectors in the same manner as in the first or second embodiment. The calculating unit 330 executes the processing described in the flowchart of FIG. 7 or 8, based on the detection result from the motion detector 310, to determine the shutter speed. The calculating unit 330 outputs the determined shutter speed to the controller 180 of the digital camera 100B. The controller 180 of the digital camera 100B images the subsequent frames at the shutter speed input from the external equipment 300.

According to the external equipment 300 of this embodiment having such a configuration, the shutter speed determination device of the present disclosure can be provided as external equipment such as the external computer or the external optional equipment.

Fifth Embodiment

In this embodiment, similarly to the fourth embodiment, a mode will be described in which the shutter speed determination device according to the present disclosure is applied to external equipment.

Figure 15:
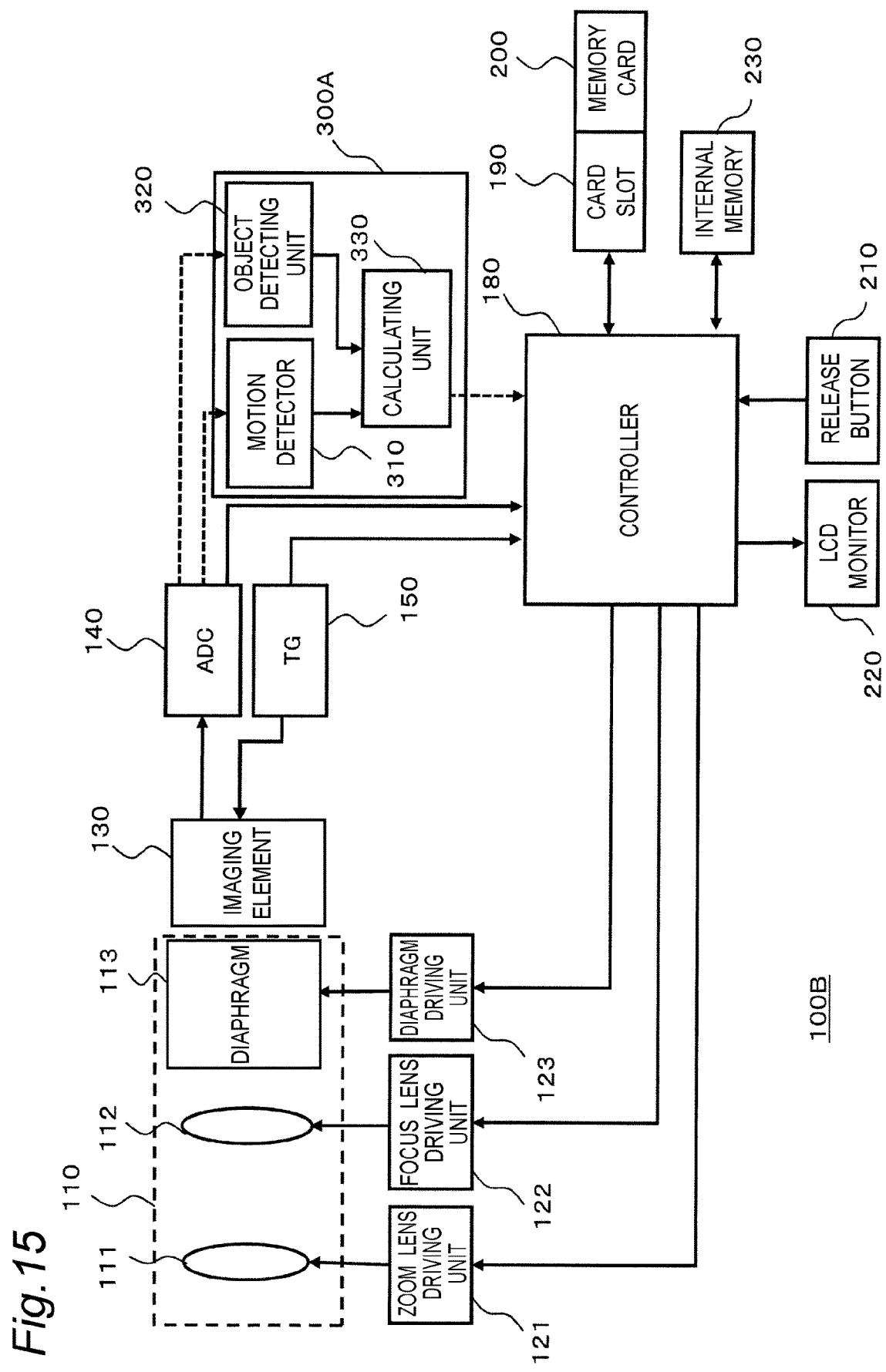
FIG. 15 is a view showing a configuration of external equipment of a fifth embodiment.

FIG. 15 is a view showing a configuration of the external equipment of a fifth embodiment.

External equipment 300A includes the motion detector 310, the object detecting unit 320, and the calculating unit 330. The external equipment 300 may be external optional equipment or an external computer that can be retrofitted or connected to a digital camera. The motion detector 310, the object detecting unit 320, and the calculating unit 330 of the external equipment 300A may be a hard-wired electronic circuit, or a CPU that executes processing based on program commands. The motion detector 310 inputs image data digitized by the AD converter 140 of the digital camera 100B and detects motion vectors in the same manner as in the second embodiment. The object detecting unit 320 detects an image of a target object such as a person or an animal contained in a captured image represented by image data digitized by the AD converter 140, in the same manner as in the third embodiment. The calculating unit 330 executes the processes described in the flowchart of FIG. 8, based on the detection result from the motion detector 310 and the detection result from the object detecting unit, to determine the shutter speed. The calculating unit 330 outputs the determined shutter speed to the controller 180 of the digital camera 100B. The controller 180 of the digital camera 100B images the subsequent frames at the shutter speed input from the external equipment 300A.

According to the external equipment 300A of this embodiment having such a configuration, the shutter speed determination device of the present disclosure can be provided as external equipment such as the external computer or the external optional equipment.

Other Embodiments

As above, the first embodiment has been described as an exemplification of the technique disclosed in the present application. However, the technique of the present disclosure is not limited thereto and is applicable to embodiments appropriately undergoing changes, permutations, additions, omissions, etc. It is also possible to combine the constituent elements described in the first embodiment into a new embodiment. Thus, other embodiments will be exemplified hereinbelow.

(1) Although in the above embodiments, the integrated-lens camera has been described, the present disclosure is applicable also to the interchangeable-lens camera.

(2) Although in the above embodiments, the digital camera has been described as an example of the imaging device, the imaging device is not limited thereto. The idea of the present disclosure is applicable to various imaging devices capable of shooting videos such as a digital video camera, a smartphone, and a wearable camera.

As above, the embodiments have been described as exemplifications of the technique of the present disclosure. To that end, the accompanying drawings and the detailed description have been provided. Accordingly, the constituent elements described in the accompanying drawings and the detailed description may include not only the essential components for problem solving but also components not essential to solve the problem for the purpose of exemplification of the technique. For that reason, immediately from the fact that those unessential components are described in the accompanying drawings and the detailed description, those unessential components should not be construed as being essential. Since the above embodiments are for the purpose of exemplifying the technique of the present disclosure, various changes, permutations, additions, omissions can be made within the scope of claims or the scope of equivalents thereof.

INDUSTRIAL APPLICABILITY

The present disclosure is widely applicable to devices determining the shutter speed when capturing a subject image.

EXPLANATIONS OF LETTERS OR NUMERALS 100, 100A digital camera
110 optical system
111 zoom lens
112 focus lens
113 diaphragm
121 zoom lens driving unit
122 focus lens driving unit
123 diaphragm driving unit
130 imaging device
140 ADC
150 TG
180 controller
190 card slot
200 memory card
210 release button
220 LCD monitor
300, 300A external equipment
230 internal memory 310 motion detector
320 object detecting unit
330 calculating unit

The invention claimed is:

1. A shutter speed determination device comprising:
a motion detector that, on a block-by-block basis having a specified block size, performs detection processing of a motion vector for image data obtained by capturing a subject image; and
a controller that, while reducing the block size, causes the motion detector to execute the detection processing repeatedly, each time executing the detection processing the controller finding a motion vector related value that changes in a same direction as a direction in which a magnitude of the motion vector changes, the controller determining a shutter speed used when capturing the subject image thereafter, based on the motion vector related value found,
wherein when amount of increase of the motion vector related value obtained in current detection processing with respect to the motion vector related value obtained in most recent detection processing becomes less than or equal to a threshold value, the control unit determines the shutter speed, based on the motion vector related value obtained in the current detection processing.

2. The shutter speed determination device according to claim 1, wherein the motion vector related value is a maximum value of the magnitudes of the motion vectors detected for blocks.

3. The shutter speed determination device according to claim 1, wherein the motion vector related value is an average value of the magnitudes of the motion vectors having upper-ranked magnitudes among the motion vectors detected for blocks.

4. The shutter speed determination device according to claim 1, wherein the motion vector related value is a middle value of the magnitudes of the motion vectors having upper-ranked magnitudes among the motion vectors detected for blocks.

5. The shutter speed determination device according to claim 1, wherein the controller sets, as a target area for current detection processing, only an area of a block in which the motion vector having an upper-ranked magnitude has been detected among the motion vectors detected in most recent detection processing.

6. The shutter speed determination device according to claim 1, wherein the controller sets, as a target area for current detection processing, only an area containing a block in which the motion vector having an upper-ranked magnitude has been detected among the motion vectors detected in most recent detection processing and blocks in the vicinity of the block.

7. The shutter speed determination device according to claim 1, wherein the controller:
finds average values by averaging the magnitudes of the motion vectors detected in most recent detection processing, on an area-by-area basis corresponding to a block of second most recent block size,
finds a difference between the average value and the magnitude of the motion vector of each block detected in second most recent detection processing for each area, and
sets only an area having an upper-ranked difference among the differences obtained as a target area for current detection processing.

8. The shutter speed determination device according to claim 1, comprising a predetermined-object detector that detects a predetermined-object image contained in an image represented by the image data, wherein
    the controller causes the motion detector to execute the detection processing for only a block containing the predetermined-object image.

9. An imaging device comprising:

a shutter speed determination device of claim 1;

an imaging sensor that captures a subject image to create image data; and a controller that causes the imaging sensor to perform imaging at a shutter speed determined by the shutter speed determination device.

\* \* \* \* \*